APPARATUS FOR FORMING SHEET METAL ARTICLES

Original Filed Aug. 27, 1953 2 Sheets-Sheet 1

INVENTOR

Donald Peccerill

BY Rockwell & Bartholow

ATTORNEYS

APPARATUS FOR FORMING SHEET METAL ARTICLES

Original Filed Aug. 27, 1953 2 Sheets-Sheet 2

INVENTOR

Donald Peccerill

BY Rochwell & Sanchelan

ATTORNEYS

United States Patent Office

Re. 24,833
Reissued May 31, 1960

24,833

APPARATUS FOR FORMING SHEET METAL ARTICLES

Donald Peccerill, 37 Susquehanna Ave., West Haven, Conn.

Original No. 2,821,945, dated Feb. 4, 1958, Ser. No. 376,889, Aug. 27, 1953. Application for reissue Nov. 28, 1958, Ser. No. 777,155

5 Claims. (Cl. 113—44)

Matter enclosed in heavy brackets [ ] appears in the original patent but forms no part of this reissue specification; matter printed in italics indicates the additions made by reissue.

This invention relates to an apparatus for shaping hollow articles, and more particularly to the shaping of articles such as containers or the like in which the inner dimensions of the article or dimensions adjacent the closed end thereof are greater than the dimensions adjacent the open end.

Many articles such as containers or cup-shaped members formed of sheet metal or the like are made by pressing or drawing operations, the workpiece being formed in a die cooperating with which is a punch which enters the interior of the article to shape it and then is withdrawn therefrom.

Such a method is very readily employed where the open end of the article or container is larger than the closed end thereof, but where the reverse is true it will be seen that the punch cannot form the blank or work into the desired shape and still be withdrawn from the smaller opening at the neck or open end of the work.

Various methods have been employed for forming articles of this shape, but all have certain disadvantages in that they are not capable of continuous and high-speed operation, for various reasons. It has, for example, been proposed to fill a cup-shaped blank with a fluid, and then, by introducing a punch into the blank, force the walls of the latter outwardly by pressure of the fluid thereon. In such cases, however, the fluid has been placed directly in the container and hence each workpiece or container must be filled for such operations, thus rendering them very slow, and therefore relatively expensive.

According to the present invention I provide at the lower end of the plunger a container or bag formed of flexible material which may be filled with a fluid, this bag being carried at the lower end of the plunger in such a manner that when the bag is inserted into the cup-shaped blank or work the plunger may travel relatively to the bag, and thus force the fluid outwardly to expand the walls of the container. The parts are so arranged that the fluid is at all times contained within the bag and thus may be used over and over again, and for this reason the device is capable of continued use and of relatively high-speed operation.

According to the invention, the container for the pressure fluid is not secured directly to the plunger but is secured in fluid-tight relation upon a collar which is slidably mounted upon the plunger but retained from dropping from the lower end thereof by a shoulder or other equivalent stop means. The collar is provided with means to close the upper end of the die opening so that, when the plunger is advanced into the die opening, the movement of the collar will be arrested when the bag reaches an innermost position, in which it will be seated within the container or workpiece, and thereafter the plunger will be advanced relatively to the collar to force the fluid outwardly and complete the pressing operation.

A spring is provided to normally urge the collar, together with the bag which it supports, toward the lower end of the plunger so that the latter will enter the die prior to the plunger. If desired, an expander may be employed at the lower end of the plunger to maintain the bag in a somewhat extended position, so that its insertion into the work will be easily effected. Also provision is made for filling the bag with a fluid and sealing it so that the fluid will not escape but may be used over and over again in the present operations.

One object of the invention is to provide a new and improved apparatus for pressing hollow articles larger at their closed than at their open ends, or articles made of irregular form from which it would be difficult or impossible to withdraw a punch made of rigid material.

A still further object of the invention is to provide an apparatus for forming hollow articles by pressure, which apparatus comprises a liquid-tight bag or container of flexible material which may be filled with a fluid, a plunger upon which the bag is carried, and means for connecting the plunger and bag such that there is relative movement between the two, so that, upon introduction of the plunger into the bag, the liquid in the latter may be forced outwardly.

A still further object of the invention is the provision of an apparatus for pressing out hollow articles by means of a plunger having at its lower end a container of flexible material, the arrangement being such that once the container is inserted into the work, the plunger will move relatively to the container within the same and thus force the flexible walls of the latter outwardly to form the work into the desired shape.

A still further object of the invention is the provision of an apparatus of the character described, wherein the fluid container will be so attached to the plunger that it may be used over and over again without loss of the fluid therefrom.

To these and other ends the invention consists in the novel features and combinations of parts to be hereinafter described and claimed.

Figure 1:
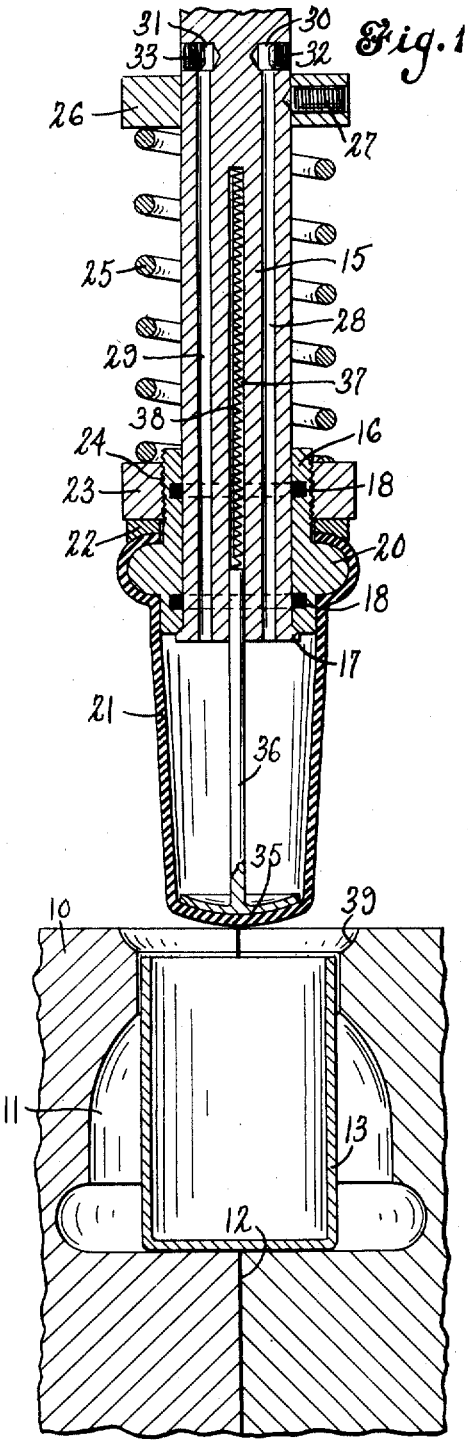
Fig. 1 is a sectional view of an apparatus for pressing hollow articles, the apparatus comprising a cooperating die and plunger, and the parts being shown at the beginning of a pressing operation.

To illustrate a preferred embodiment of my invention, I have shown in the drawings a die 10 having therein a die opening 11 of irregular form, and it will be particularly noted that the mouth of the opening is smaller than the lower portion thereof so that an article formed therein according to the shape of the die will be larger at its lower portion than at its upper portion.

As shown, the die member 10 is divided in two sections along the dividing line 12, so that the die sections may be parted in order that the work may be withdrawn from the die. If desirable, the die member may be divided into any number of sections which may be found to be necessary to provide for the ready withdrawal of the work.

A workpiece is shown at 13, this member being illustrated as of cup-shaped form, although it may be formed in a preliminary way of any desired shape depending upon the shape desired in the finished article. The cup-shaped member 13 may, if desired, be stamped from a disk or flat plate of sheet metal, but may be formed in any way desired.

As shown in the drawing, a plunger 15 is designed to cooperate with the die above described. Upon the lower end of this plunger is slidably mounted a sleeve 16, this sleeve being held in place by a shoulder or like enlargement 17 at the lower end of the plunger, and, as will be explained hereinafter, is spring urged toward a position in which the lower end of the collar seats upon this shoulder, as shown in Fig. 1. Gaskets or O-rings 18 of packing material may be provided between the collar and the outer wall of the plunger so that a fluid-tight connection will be made.

The collar 16 is provided with an outwardly projecting annular shoulder or stop member 20, and over this shoulder is positioned the upper open end of a bag or container 21 of flexible fluid-tight material such as neoprene, for example, although any desired material may be employed. A washer 22 may be positioned on the collar 16 above the shoulder 20, so that it bears upon the upper edge of the material of the bag 21, this washer being forced against the material of the bag by a retaining ring 23 threaded upon the collar 16, as shown at 24. In this manner the material of the bag is forced tightly against the upper surface of the annular shoulder 20 to make a fluid-tight connection therewith.

A compression spring 25 surrounds the plunger and acts at its lower end against the retaining ring 23 and at its upper end against a stop member 26 secured in any desired way to the plunger, such as by the set screw 27. The spring will, therefore, tend to hold the collar 16 in the position shown in Fig. 1, in which its lower end abuts the stop or shoulder 17 at the lower end of the plunger. This will provide for the movement of the bag 21 and collar with the plunger unless and until the movement of the collar 16 is prevented, and, in that event, the plunger will be allowed to continue its movement relatively to the collar, thus inserting the plunger into the bag.

The plunger may be provided with fluid passages 28 and 29 in order that fluid may be introduced into the bag 21, the upper ends of these passages opening outwardly through the plunger by means of ports 30 and 31 which may be sealed by screw-threaded plugs 32 and 33. Any desired pressure fluid such as oil or water may be introduced through one of these passages, and the air in the container will be permitted to exhaust through the other passage so that the container may be filled to the desired extent. At its upper end the plunger may be secured to any desired actuating means, such, for example, as the ram 34 of one of the usual forms of mechanical presses.

If desired, an expander may be used to hold the container or bag 21 in extended position. Such an expander is shown at 35, it being carried upon the lower end of a stem 36 slidably received in a central bore 37 of the plunger 15. A spring 38 in this bore tends to urge this expander to projected position.

Figure 3:
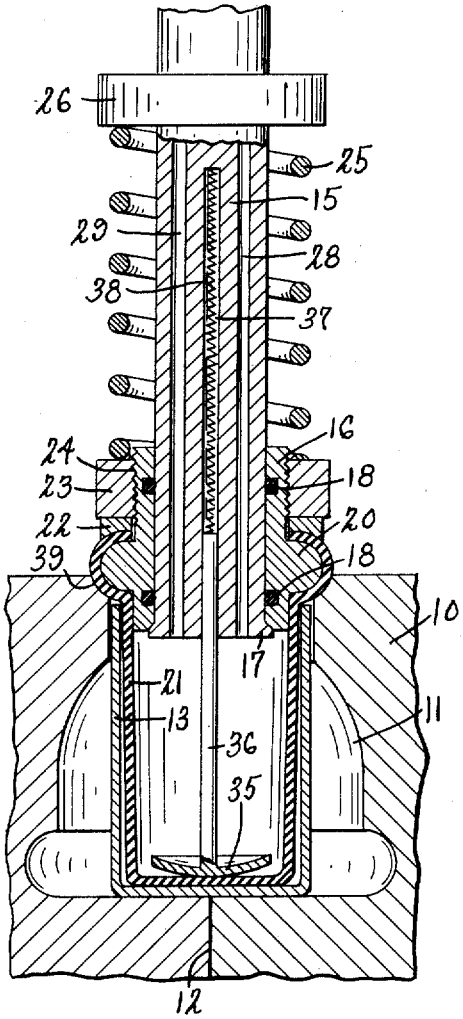
Fig. 3 is a view similar to Figs. 1 and 2, showing the parts at an intermediate position.

In the operation of the device, the parts are assembled as shown in Fig. 1, and the cup-shaped workpiece or blank 13 is inserted into the opening 11 in the die member 10. The ram of the press is then brought down, causing the plunger to descend and the bag 21 will be introduced into the workpiece 13, as shown in Fig. 3.

At this time the collar 20 upon the plunger will engage the upper portion 39 of the die opening, which may be slightly enlarged at this point to receive it, so that the wall of the container adjacent the collar will seat tightly against the portion 39 of the die opening and arrest downward movement of the collar. The die opening will be sealed in this manner and the punch will be permitted to move relatively to the die.

Figure 2:
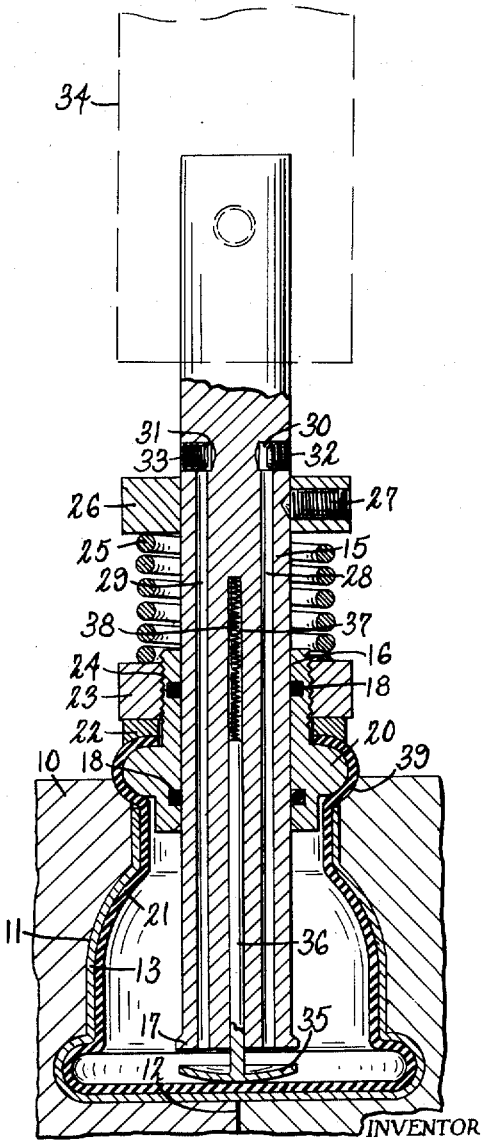
Fig. 2 is a similar view of the part shown in Fig. 1, in the position occupied at the completion of a pressing operation.

Additional movement of the plunger will move it relatively to the collar 16 and cause its lower end to enter the flexible bag 21, as shown in Fig. 2, compressing the spring 25. This movement of the plunger into the bag will force the fluid therein outwardly, thus expanding the workpiece and causing it to conform to the die opening. The plunger may then be withdrawn, carrying with it the collar 16 and bag 21 as soon as the spring 25 has been allowed to expand, thus returning the parts to the position shown in Fig. 1. At this time the die sections may be separated to remove the work therefrom.

While I have shown and described a preferred embodiment of my invention, it will be understood that it is not to be limited to all of the details shown, but is capable of modification and variation within the spirit of the invention and within the scope of the claims.

What I claim is:

1. A press mechanism comprising a plunger for insertion into a die, a collar slidably mounted on the plunger from which the plunger may project in both directions, a pressure fluid bag of flexible material having an open upper end secured to said collar and closed at its lower end, said bag depending from the collar to embrace the lower end of the plunger and receive the latter therewithin, stop means on said collar to check the movement thereof and permit the plunger to move relatively to the collar and the lower end of the plunger to descend into the bag and exert pressure on the fluid therein, actuating means connected to the plunger above the collar, a die member having an opening to receive the bag when the plunger is actuated, and means on the die member to engage the stop means on said collar to limit movement of the latter and permit the plunger to move relatively to the collar and into the bag in the die opening.

2. A press mechanism comprising a plunger for insertion into a die, a collar slidably mounted on the plunger from which the plunger may project in both directions, a pressure fluid bag of flexible material having an open upper end secured to said collar and closed at its lower end, said bag depending from the collar to embrace the lower end of the plunger and receive the latter therewithin, stop means on said collar to check the movement thereof and permit the plunger to move relatively to the collar and the lower end of the plunger to descend into the bag and exert pressure on the fluid therein, actuating means connected to the plunger above the collar, a die member having an opening to receive the bag when the plunger is actuated, and means on the die member to engage the stop means on said collar to limit movement of the latter and permit the plunger to move relatively to the collar and into the bag in the die opening, said stop means on the collar comprising a laterally projecting stop member to contact the die and close the mouth of the die opening.

3. A press mechanism comprising a plunger for insertion into a die, a collar slidably mounted on the plunger from which the plunger may project in both directions, a pressure fluid bag of flexible material having an open upper end secured to said collar and closed at its lower end, said bag depending from the collar to embrace the lower end of the plunger and receive the latter therewithin, stop means on said collar to check the movement thereof and permit the plunger to move relatively to the collar and the lower end of the plunger to descend into the bag and exert pressure on the fluid therein, actuating means connected to the plunger above the collar, a die member having an opening to receive the bag when the plunger is actuated, means on the die member to engage the stop means on said collar to limit movement of the latter and permit the plunger to move relatively to the collar and into the bag in the die opening, retaining means on the plunger to retain the collar at the lower portion thereof with the bag projecting from the end of the plunger, and means urging said collar downwardly against said retaining means.

*4. A press mechanism comprising a die having an*

*opening therein, a reciprocable plunger, a collar slidably embracing the plunger from which collar the plunger projects upwardly, a pressure-fluid bag of flexible material carried by the collar and having its open upper end secured in fluid-tight relation to the collar and closed at its lower end and depending from the collar for insertion into the die opening, means to retain the collar on the plunger, stop means on said collar to engage the die and check movement of the collar and permit the plunger to move downwardly relatively to the collar and bag and exert pressure on the fluid in the bag, actuating means connected to the plunger above the collar, and said plunger being in fluid-tight relation to the collar whereby fluid is trapped and displaced in the bag to expand the latter outwardly.*

*5. A press mechanism comprising a die having an opening therein, a reciprocable plunger, a collar slidably embracing the plunger from which collar the plunger projects upwardly, a pressure-fluid bag of flexible material carried by the collar and having its open upper end secured in fluid-tight relation to the colar and closed at its lower end and depending from the collar for insertion into the die opening, means to retain the collar on the plunger, stop means on said collar to engage the die and check movement of the collar and permit the plunger to move downwardly relatively to the collar and bag and exert pressure on the fluid in the bag, actuating means connected to the plunger above the collar, and said plunger being in fluid-tight relation to the collar and in direct contact with the fluid in the bag whereby fluid is trapped and displaced in the bag to expand the latter outwardly.*

References Cited in the file of this patent or the original patent

UNITED STATES PATENTS

| | | |
|---|---|---|
| 464,736 | Stapley | Dec. 8, 1891 |
| 731,367 | Huber | June 16, 1903 |
| 2,001,760 | Barker | May 21, 1935 |
| 2,298,132 | Johnson | Oct. 6, 1942 |

FOREIGN PATENTS

| | | |
|---|---|---|
| 363,533 | France | Aug. 2, 1906 |